United States Patent
Callicoat et al.

(10) Patent No.: US 8,116,978 B2
(45) Date of Patent: Feb. 14, 2012

(54) NAVIGATION DEVICE WITH IMPROVED INTERFACE AND MOUNTING FEATURES

(75) Inventors: Matthew L. Callicoat, Olathe, KS (US); Paul E. Skelton, Lenexa, KS (US); Kevin M. Hansen, Lawrence, KS (US); Brian M. Sandefur, Lawrence, KS (US); Choy Wai Lee, Olathe, KS (US); Mark A. Kelsay, Jr., Overland Park, KS (US)

(73) Assignee: Garmin Switzerland GmbH (CH)

( * ) Notice: Subject to any disclaimer, the term of this patent is extended or adjusted under 35 U.S.C. 154(b) by 0 days.

(21) Appl. No.: 13/096,407

(22) Filed: Apr. 28, 2011

(65) Prior Publication Data

US 2011/0205697 A1    Aug. 25, 2011

Related U.S. Application Data

(62) Division of application No. 11/696,478, filed on Apr. 4, 2007.

(51) Int. Cl.
G01C 21/00 (2006.01)
H05K 7/00 (2006.01)

(52) U.S. Cl. ............. 701/400; 701/36; 361/679.01

(58) Field of Classification Search .......... 701/200, 701/220, 36, 400; 361/679.01
See application file for complete search history.

(56) References Cited

U.S. PATENT DOCUMENTS

| | | |
|---|---|---|
| 6,173,933 B1 | 1/2001 | Whiteside et al. ......... 248/276.1 |
| 6,208,934 B1 | 3/2001 | Bechtolsheim .............. 701/209 |
| 6,321,158 B1 | 11/2001 | DeLorme et al. .......... 701/201 |
| 6,330,149 B1 | 12/2001 | Burrell ........................ 361/683 |
| 6,370,037 B1 | 4/2002 | Schoenfish .................. 361/807 |
| 6,411,502 B1 | 6/2002 | Burrell ........................ 361/81 |
| 6,654,826 B1 | 11/2003 | Cho et al. ...................... 710/62 |
| 6,658,272 B1 | 12/2003 | Lenchik et al. ............. 455/575 |
| 7,142,195 B2 | 11/2006 | Northway et al. ........... 345/169 |
| 7,296,711 B2 | 11/2007 | Hayakawa et al. ...... 222/153.14 |
| 7,296,771 B2 | 11/2007 | Kalis et al. ................ 248/288.31 |
| 7,493,088 B2 | 2/2009 | Levy et al. ................ 455/67.11 |
| 7,545,784 B2 | 6/2009 | Mgrdechian et al. ......... 370/338 |
| 7,788,188 B2 | 8/2010 | Kramer ........................ 705/319 |
| 7,817,085 B2 | 10/2010 | Harris ...................... 342/357.21 |
| 7,822,546 B2 | 10/2010 | Lee ............................. 701/209 |
| 2003/0114206 A1 | 6/2003 | Timothy et al. ............. 455/575 |
| 2004/0203897 A1 | 10/2004 | Rogers ...................... 455/456.1 |
| 2005/0054352 A1 | 3/2005 | Karaizman ................ 455/456.3 |

(Continued)

FOREIGN PATENT DOCUMENTS

KR    10-2004-0051202    6/2004

OTHER PUBLICATIONS

Garmin's Quest and Quest 2 Owner's Manual, Jan. 2006.
Garmin's StreetPilot 2820 Owner's Manual, Mar. 2006.
International Search Report from corresponding International Application No. PCT/US2009/031720, dated Aug. 31, 2009.

(Continued)

Primary Examiner — Yonel Beaulieu
(74) Attorney, Agent, or Firm — Samuel M. Korte (57) ABSTRACT

A device with an improved user interface and mounting features comprises a sensor operable to detect a mounting configuration of the device, a display, and a processing system coupled with the sensor and the display. The processing system is generally operable to receive an indication of the detected mounting configuration from the sensor and present information on the display according to the detected mounting configuration.

18 Claims, 10 Drawing Sheets

U.S. PATENT DOCUMENTS

| | | | |
|---|---|---|---|
| 2005/0170803 A1 | 8/2005 | Jo | 455/234.1 |
| 2007/0038364 A1 | 2/2007 | Lee et al. | 701/200 |
| 2007/0258348 A1 | 11/2007 | Matsuda et al. | 369/275.4 |
| 2008/0059061 A1 | 3/2008 | Lee | 701/209 |
| 2009/0101766 A1* | 4/2009 | Kalis et al. | 248/121 |
| 2009/0191854 A1 | 7/2009 | Beason | 455/418 |

OTHER PUBLICATIONS

U.S. Appl. No. 11/696,478, filed Apr. 4, 2007.
Verizon Wireless, VZ Navigator—Answers to FAQs, 11 pages, published prior to Jan. 24, 2008.
Wikipedia, iPhone, 17 pages, published Jan. 23, 2008.

* cited by examiner

NAVIGATION DEVICE WITH IMPROVED INTERFACE AND MOUNTING FEATURES

RELATED APPLICATION

The present application is divisional of, and claims priority benefit to, commonly assigned U.S. patent application Ser. No. 11/696,478, entitled "NAVIGATION DEVICE WITH IMPROVED USER INTERFACE AND MOUNTING FEATURES", filed Apr. 4, 2007. The above-identified application is incorporated herein by reference in its entirety.

BACKGROUND OF THE INVENTION

1. Field of the Invention

Embodiments of the present invention relate to electronic devices. More particularly, various embodiments of the invention provide electronic devices having improved user interfaces and mounting features to facilitate their convenient and efficient use.

2. Description of the Related Art

Electronic and navigation devices are commonly employed to generate information for fitness, entertainment, and navigation purposes. For example, navigation devices may be configured to calculate travel routes and provide guidance using the Global Positioning System (GPS). Unfortunately, electronic and navigation devices are often operable for use only in a one mounting configuration. For example, navigation devices intended for pedestrians or automobile drivers may not be suitable for use by motorcycle riders, and vice versa.

SUMMARY OF THE INVENTION

Embodiments of the present invention solve the above-described problems and provide a distinct advance in the art of using and mounting electronic devices. More particularly, various embodiments of the invention provide electronic devices having improved user interfaces and mounting features to facilitate their convenient and efficient use.

In various embodiments, the present invention provides a device including a sensor operable to detect a mounting configuration of the device, a display, and a processing system coupled with the sensor and the display. The processing system is generally operable to receive an indication of the detected mounting configuration from the sensor and present information on the display according to the detected mounting configuration. For example, the sensor may detect when the device is coupled with a particular mount and the processing system may present information on the display in a format corresponding to the particular mount.

The device may be configured to present an input index on the display corresponding to a plurality of inputs. The presented input index includes a positionable index portion corresponding to only a portion of the inputs. The processing system is operable to receive a signal from the display to detect a change in the position of the positionable index portion, identify inputs corresponding to the positionable index portion, and present the identified inputs on the display. Thus, for example, a user may easily maneuver the positionable index portion to present a desired input, such as an alphanumeric character, for selection.

It is to be understood that both the foregoing general description and the following detailed description are exemplary and explanatory only and are not necessarily restrictive of the invention claimed. The accompanying drawings, which are incorporated in and constitute a part of the specification, illustrate embodiments of the invention and together with the general description, serve to explain the principles of the invention.

BRIEF DESCRIPTION OF THE DRAWING FIGURES

A preferred embodiment of the present invention is described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In various embodiments, the present invention enables information to be presented according to a mounting configuration of a device, allows users to easily select an input from an index of inputs, and provides mounting functionality operable to securely couple a device and a mount.

As shown in FIGS. 1 through 17, embodiments of the present invention may be implemented in an electronic device 10. The device 10 may be any electronic device or system operable to receive, utilize, or otherwise generate information and data, such as a current geographic location or traffic information associated with a location. Thus, the device 10 may include computers, televisions, radios, portable processing systems such as laptops or personal data assistants (PDAs), cellular telephones, portable entertainment devices, and the like. In some embodiments, the device 10 is a navigation device manufactured by GARMIN INTERNATIONAL, INC. of Olathe, Kans. However, the device 10 may be any device configured as described herein or otherwise operable to perform the functions described below.

Figure 10:
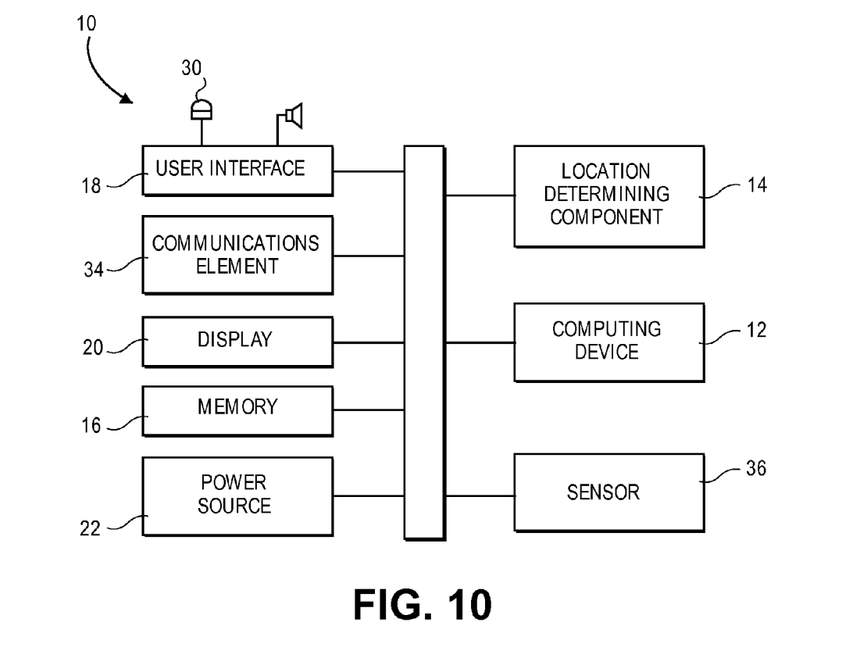
FIG. 10 is a block diagram of certain components of the electronic device of FIG. 1.

The device 10 may include a processing system 12, a location determining component 14 coupled with the processing system 12 to facilitate determination of a current geographic location, a memory 16 coupled with the processing system 12 and operable to store information, a user interface 18 coupled with the processing system 12 and operable to communicate with a user, a display 20 and power source 22 each coupled with the processing system 12, and a housing 24 for housing the various components of the device 10.

The processing system 12 may be coupled with the user interface 18, location determining component 14, memory 16, and display 20, through wired or wireless connections, such as a data bus, to enable information to be exchanged between the various elements.

The processing system 12 may comprise various computing elements, such as integrated circuits, microcontrollers, microprocessors, programmable logic devices, discrete logic components, application specific integrated circuits, and the like, alone or in combination, to perform the operations described herein. Further, the processing system 12 may be operable to control the various functions of the device 10 according to a computer program, including one or more code segments, or other instructions associated with the memory 16 or with various processor logic and structure.

The computer program may comprise a plurality of code segments arranged as ordered listing of executable instructions for implementing logical functions in the processing system 12. The computer program can be embodied in any computer-readable medium, including the memory 16, for use by or in connection with an instruction execution system, apparatus, or device, such as a computer-based system, processor-containing system, or other system that can fetch the instructions from the instruction execution system, apparatus, or device, and execute the instructions.

In the context of this application, a "computer-readable medium" can be any means that can contain, store, communicate, propagate or transport the program for use by or in connection with the instruction execution system, apparatus, or device. The computer-readable medium can be, for example, but not limited to, an electronic, magnetic, optical, electro-magnetic, infrared, or semi-conductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, a compact disc (CD), a digital video disc (DVD), combinations thereof, and the like. The computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in the memory 16.

As described below in more detail, the processing system 12 may be operable to determine a current geographic location of the device 10 by receiving the geographic location from the location determining component 14 or from another device through the user interface 18. Alternatively, the processing system 12 may independently determine geographic locations based on information and/or data, such as received navigation signals, provided by the location determining component 14, stored within the memory 16, or acquired from other devices or elements.

The location determining component 14 may be a Global Positioning System (GPS) receiver, and is adapted to provide, in a substantially conventional manner, geographic location information for the device 10. The location determining component 14 may be, for example, a GPS receiver much like those disclosed in U.S. Pat. No. 6,434,485, which is incorporated herein by specific reference. However, the location determining component 14 may receive cellular or other positioning signals utilizing various methods to facilitate determination of geographic locations without being limited to GPS.

The GPS is a satellite-based radio navigation system that allows determination of navigation information, such as position, velocity, time, and direction, for an unlimited number of users. Formally known as NAVSTAR, the GPS incorporates a plurality of satellites that orbit the earth.

The location determining component 14 scans for GPS satellite signals and, upon receiving signals from at least three different satellite signals, the location determining component 14 utilizes the three satellite signals to determine its own position. Acquiring a fourth satellite signal will allow the location determining component 14 to calculate its three-dimensional position by the same calculations. As should be appreciated, the processing system 12 may be operable to perform one or more of these functions in place of the location determining component 14.

Although GPS enabled devices are often used to describe navigation devices, it will be appreciated that satellites need not be used to determine a geographic position of a receiving unit since any receiving device capable of receiving signals from multiple transmitting locations can perform basic triangulation calculations to determine the relative position of the receiving device with respect to the transmitting locations. For example, cellular towers or any customized transmitting radio frequency towers can be used instead of satellites. With such a configuration, any standard geometric triangulation algorithm can be used to determine the exact location of the receiving unit.

Figure 11:
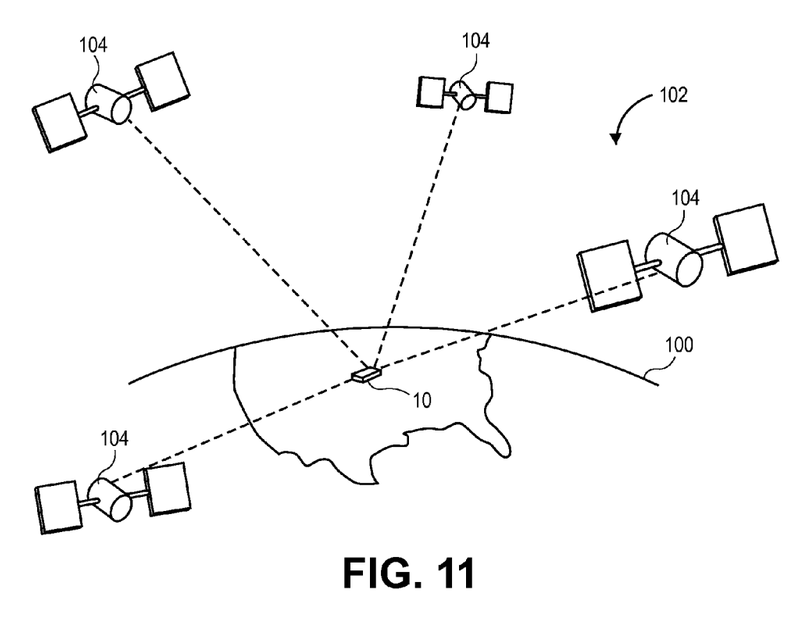
FIG. 11 is schematic diagram of a Global Positioning System (GPS) that may be utilized by various embodiments of the present invention.

FIG. 11 shows one representative view of a GPS denoted generally by reference numeral 102. A plurality of satellites 104 are in orbit about the Earth 100. The orbit of each satellite is not necessarily synchronous with the orbits of other satellites and, in fact, is likely asynchronous. The navigation device 10, including the location determining component 14, is shown receiving spread spectrum GPS satellite signals from the various satellites 104.

The location determining component 14 may also include various processing and memory elements to determine the geographic location of the device 10 itself or it may provide information to the processing system 12 to enable the processing system 12 to specifically determine the geographic location of the device 10. Thus, the location determining component 14 need not itself calculate the current geographic location of the device 10 based upon received signals. The location determining component 14 also may include an antenna for receiving signals, such as a GPS patch antenna or helical antenna.

Further, the location determining component 14 may be integral with the processing system 12 and/or memory 16 such that the location determining component 14 may be operable to specifically perform the various functions described herein. Thus, the processing system 12 and location determining component 14 need not be separate or otherwise discrete elements.

In various embodiments the location determining component 14 does not directly determine the current geographic location of the device 10. For instance, the location determining component 14 may determine the current geographic location utilizing the user interface 18, such as by receiving location information from the user, through the communications network, from another electronic device, combinations thereof, and the like.

The memory 16 is coupled with the processing system 12 and/or other device 10 elements and is operable to store various data utilized by the processing system 12 and/or other elements. The memory 16 may include removable and non-removable memory elements such as RAM, ROM, flash, magnetic, optical, USB memory devices, and/or other conventional memory elements.

Further, the memory 16 may comprise a portion of the user interface 18 to enable the user to provide information to the device 10 via the memory 16, such as by inserting a removable memory element into a slot to provide information and instruction to the device 10. The memory 16 may also be integral with the processing system 12, such as in embodiments where the memory 16 comprises internal cache memory.

The memory 16 may store various data associated with operation of the device 10, such as a computer program, code segments, or other data for instructing the processing system 12 and other device 10 elements to perform the steps described below. Further, the memory 16 may store various cartographic data corresponding to geographic locations including map data, and map elements, such as thoroughfares, terrain, alert locations, points of interest, geographic entities, traffic information and events, and other navigation data to facilitate the various navigation functions provided by the device 10. Additionally, the memory 16 may store destination addresses and previously calculated or otherwise acquired routes to various destination addresses for later retrieval by the processing system 12.

Further, the various data stored within the memory 16 may be associated within a database to facilitate processing system 12 retrieval of information. For example, the database may be configured to enable the processing system 12 to retrieve geographic locations, geographic entities, and traffic information based upon a current geographic location of the device 10, as is discussed at length below.

The user interface 18 enables users, third parties, or other devices to share information with the device 10. The user interface 18 is generally associated with the housing 24, such as by physical connection through wires or wirelessly utilizing conventional wireless protocols. Thus, the user interface 18 need not be physically coupled with the housing 24.

The user interface 18 may comprise one or more functionable inputs 28 such as buttons, switches, scroll wheels, a touch screen associated with the display 20, voice recognition elements such as a microphone 30, pointing devices such as mice, touchpads, trackballs, styluses, a camera such as a digital or film still or video camera, combinations thereof, and the like. Further, the user interface 18 may comprise wired or wireless data transfer elements such as removable memory including the memory 16, data transceivers, and the like, to enable the user and other devices or parties to remotely interface with the device 10.

Figure 9:
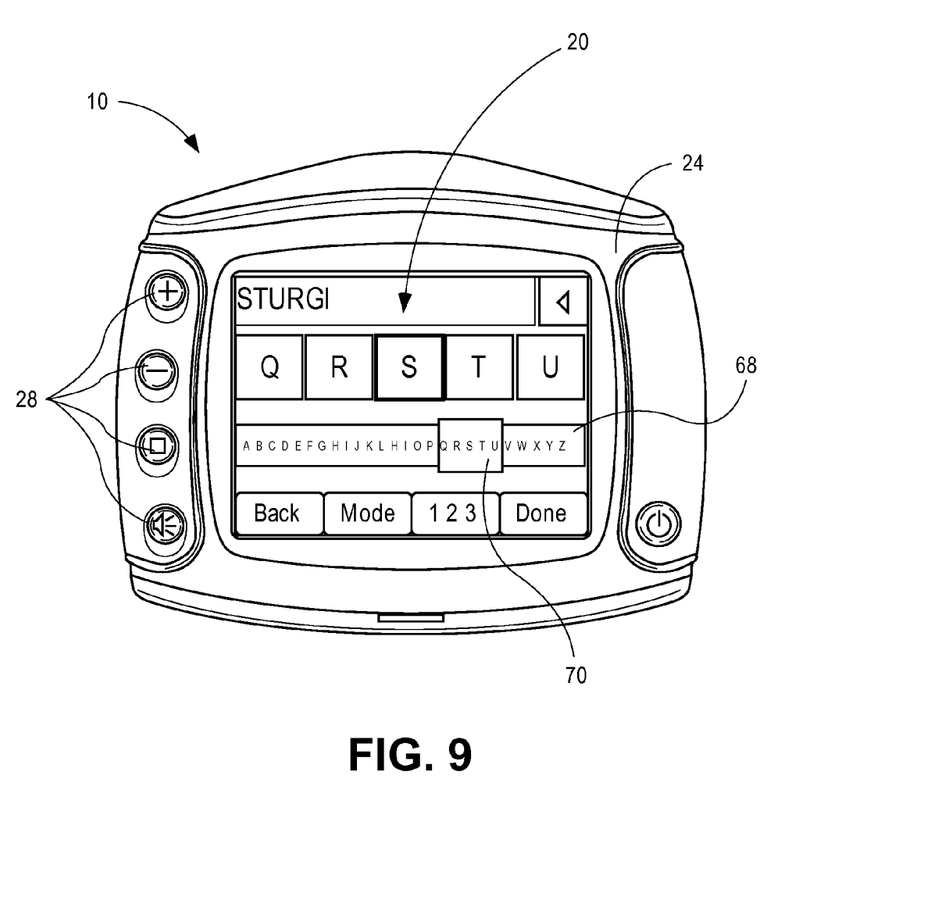
FIG. 9 is a perspective view of the electronic device of FIG. 1 presenting information on a display in a landscape orientation.

As shown in FIG. 9, the functionable inputs 28 may be positioned along a left side of the housing 24 to enable the device 10 to be functioned by a motorcycle rider's free (left) hand while the rider is sitting and engaging the brake lever with his or her right hand. In some embodiments, each of the functionable inputs 28 may be positioned along the left side of the housing 24 while in other embodiments some of the functionable inputs 28 may be positioned on other portions of the housing 24. For example, a power input may be positioned on a right side of the housing 24 as it is unlikely to be repeatedly functioned.

In some embodiments, the user interface 18 may include a communications element 34 to enable the device 10 to communicate with other processing systems, navigation devices, and any other network enabled devices through a communication network, such as the Internet, a local area network, a wide area network, an ad hoc or peer to peer network, or a direct connection such as a USB, Firewire, or Bluetooth connection, and the like. Similarly, the user interface 18 may be configured to allow direct communication between similarly configured navigation devices, such that the device 10 need not necessarily utilize the communications network to share geographic location or traffic information.

In various embodiments the communications element 34 may enable the device 10 to wirelessly communicate with communications networks utilizing wireless data transfer methods such as WiFi (802.11), Wi-Max, Bluetooth, ultra-wideband, infrared, cellular telephony, radio frequency, and the like. However, the communications element 34 may couple with the communications network utilizing wired connections, such as an Ethernet cable, and is not limited to wireless methods.

The user interface 18 may be operable to provide various information to the user utilizing the display 20 or other visual or audio elements such as a speaker. Thus, the user interface 18 enables the user and device 10 to exchange information relating to the device 10, including traffic information and events, geographic entities, configuration, security information, preferences, route information, points of interests, alerts and alert notification, navigation information, waypoints, traffic information, a destination address, and the like.

The display 20 is coupled with the processing system 12 and/or other device 10 elements and is operable to display various information corresponding to the device 10, such as traffic information and events, maps, locations, and security information as is described below. The display 20 may comprise conventional black and white, monochrome, or color display elements including TFT and LCD devices. Preferably, the display 20 is of sufficient size to enable the user to easily view the display 20 to receive presented information while in transit.

Further, as described above, the display 20 may comprise a portion of the user interface 18, such as in embodiments where the display 20 is a touch-screen display to enable the user to interact with the display 20 by touching or pointing at display areas to provide information to the device 10.

The power source 22 is associated with the housing 24 to provide electrical power to various device 10 elements. For example, the power source 22 may be directly or indirectly coupled with the user interface 18, location determining component 14, processing system 12, memory 16, and/or display 20. The power source 22 may comprise conventional power supply elements, such as batteries, battery packs, and the like. The power source 22 may also comprise power conduits, connectors, and receptacles operable to receive batteries, battery connectors, or power cables. For example, the power source 22 may include both a battery to enable portable operation and a power input for receiving power from an external source such an automobile.

The device 10 also may include a sensor 36 operable to detect an orientation and/or mounting configuration of the device 10. For example, the sensor 36 may be operable to detect the position, acceleration, and/or alignment of the device 10 along a one, two, and/or three-dimensional axis. The sensor 36 may include gyroscopes, accelerometers, compasses, inclinometers, optical detection elements, combinations thereof, and the like, to intermittently or continuously determine the particular orientation or alignment of the device 10. The sensor 36 may be operable to detect when the device 10 is in a first orientation, such as when the device 10 is vertically orientated, and when the device 10 is a second orientation, such as when the device 10 is horizontally oriented.

In various embodiments, the sensor 36 may detect the mounting configuration of the device 10 by detecting if the device 10 is coupled with a mount and by detecting the particular type of mount the device 10 is coupled with. As is discussed in more detail below, the device 10 may be operable to couple with an automobile mount and a motorcycle mount. The sensor 36 is operable to detect when the device 10 is coupled with the automobile mount, when the device 10 is coupled with the motorcycle mount, and when the device 10 is not coupled with a mount.

To detect the mounting configuration of the device 10, the sensor 36 may include one or more electrical contacts operable to wired or wirelessly electrically connect with the mounts to receive a signal therefrom. The sensor 36 may detect a particular signal using one or more of the electrical contacts to determine which mount the device 10 is coupled with, detect the absence of a signal to determine that the device 10 is not coupled with one of the mounts, combinations thereof, and the like.

The sensor 36 may additionally or alternatively detect the mounting configuration of the device 10 utilizing components other than the electrical contacts, such as switches that are activated when the device 10 couples with a particular mount, magnetic or Hall-effect sensors, capacitive sensors, or wireless radio devices, such as RFID tags, that are operable to wirelessly detect proximity to nearby mounts, combinations thereof, and the like. Furthermore, the sensor 36 may alternatively detect the presence of user contact (e.g. being held in the hand) via capacitive, resistive, thermal, or radio coupling sensing, or other biological properties.

The housing 24 may be handheld or otherwise portable to facilitate transport of the device 10 between locations. The housing 24 may be comprised of generally conventional and durable materials, such as ABS, plastics, and/or metals to protect the enclosed and associated elements. In some embodiments, the housing 24 may include a pin recess 38 operable to receive a locking pin 40 from a mount, as is discussed in more detail below. The pin recess 38 may include a portion of the sensor 36 to enable the sensor 36 to detect when the pin recess 38 receives the locking pin 40 and the configuration of the locking pin 40. The dimensions of the pin recess 38 may generally correspond to the dimensions of the locking pin 40 to ensure that at least a portion of the locking pin 40 is snugly received within the pin recess 38. In some embodiments, the housing 24 may include a plurality of pin recesses for receiving a plurality of locking pins.

Figure 13:
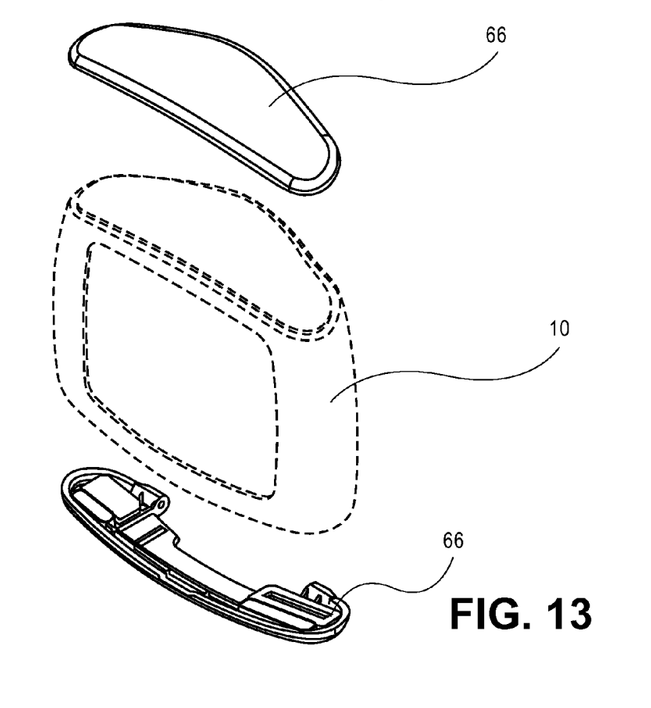
FIG. 13 is a perspective view of the electronic device of FIG. 1 showing the device's removable end caps.

The housing 24 may also be configured to couple with a plurality of removable end caps 66, as shown in FIG. 13. In particular, the top and bottom of the housing 24 may include a recess, or other interlocking elements such as latches, clasps, and the like, to receive and retain the end caps 66. Such a configuration enables users to customize the housing 24 by selecting end caps 66 having a particular color, shape, pattern, design, combinations thereof, and the like.

Figure 1:
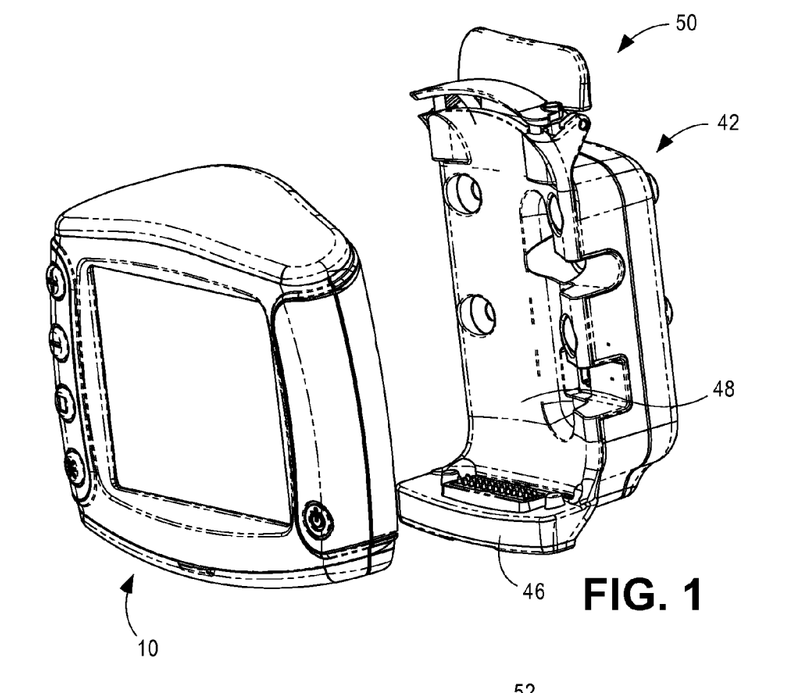
FIG. 1 is a perspective view of an electronic device configured in accordance with various preferred embodiments of the present invention, the electronic device shown positioned in proximity to a first mount.
Figure 2:
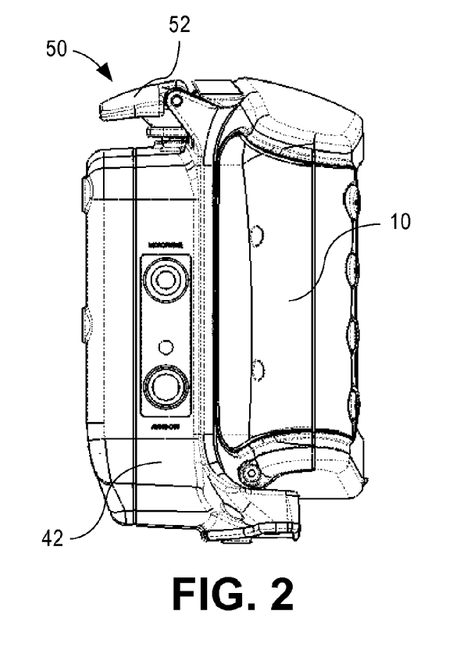
FIG. 2 is a side view of the electronic device of FIG. 1, the electronic device shown coupled with the first mount.
Figure 3:
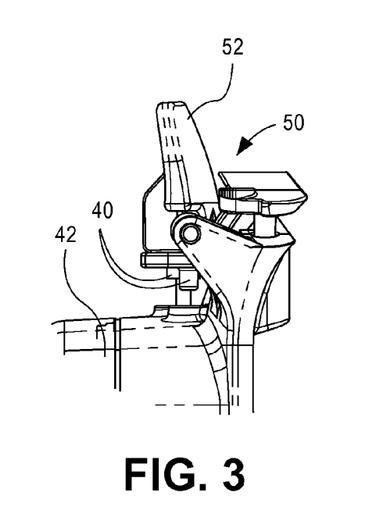
FIG. 3 is a side view of a portion of the first mount of FIGS. 1 and 2 showing a locking device in more detail.
Figure 4:
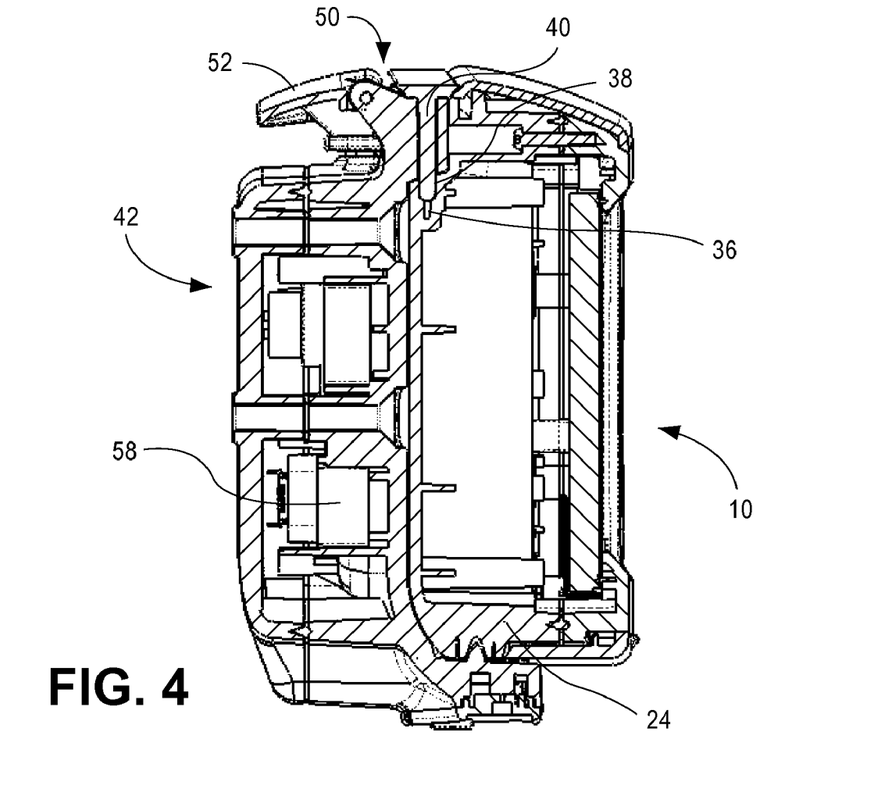
FIG. 4 is a cross section of the electronic device and first mount of FIG. 2.
Figure 5:
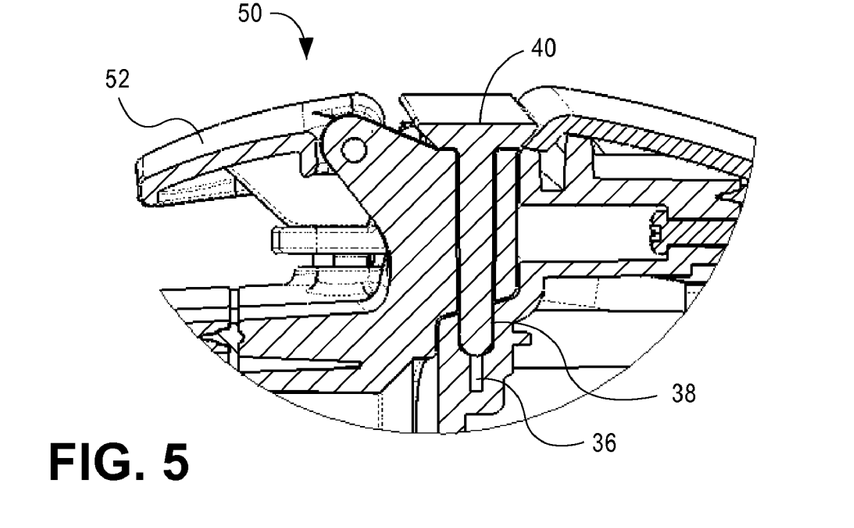
FIG. 5 is a cross section of the electronic device and first mount of FIGS. 2 through 4 showing the locking device in more detail.
Figure 14:
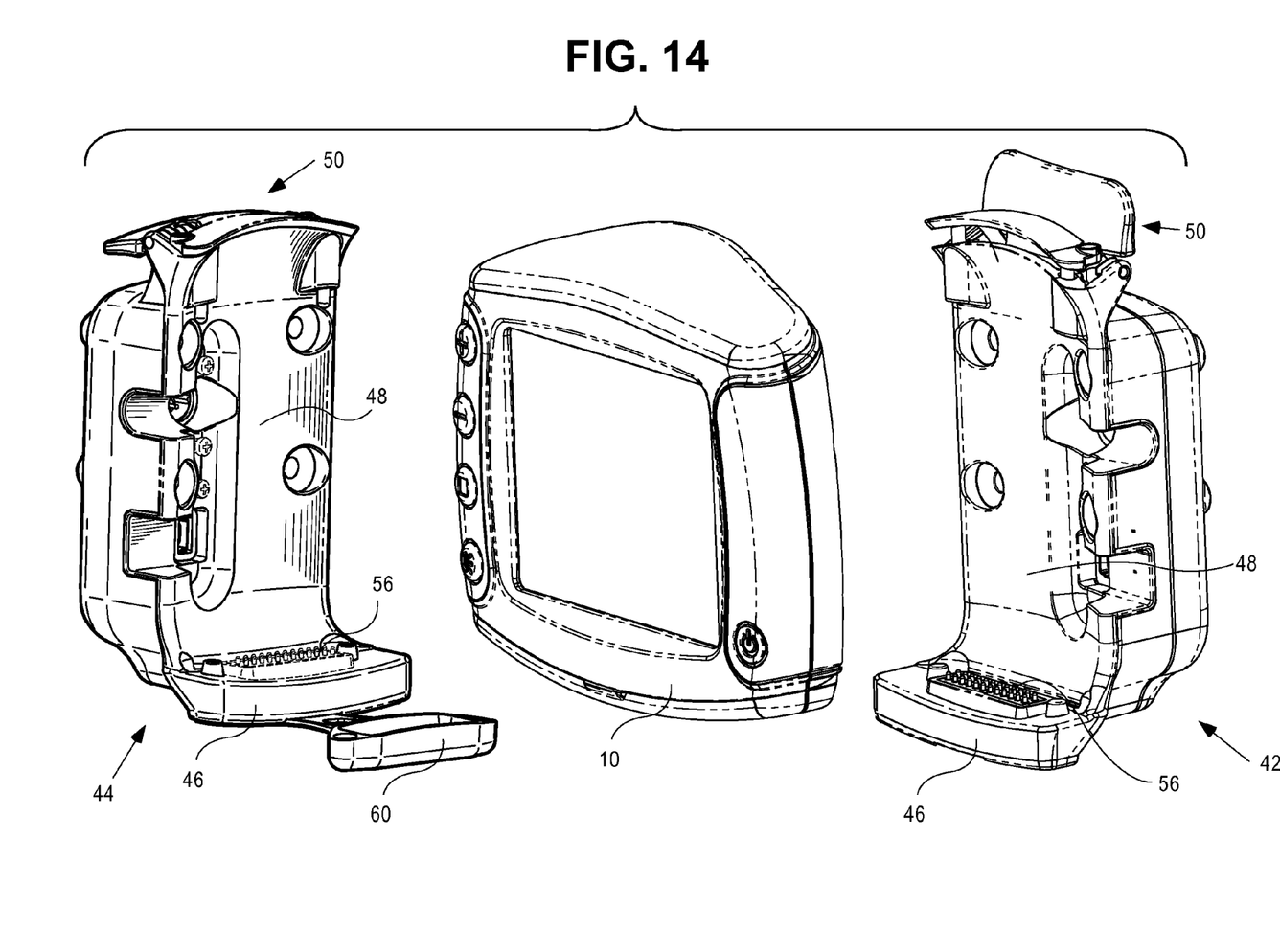
FIG. 14 a perspective view of the electronic device and first mount of FIG. 1 positioned in proximity to a second mount.

The housing 24 may be operable to couple with one or more mounts to enable the device 10 to be conveniently secured to various surfaces. In some embodiments, the housing 24 is operable to separately couple with an automobile mount 42 and a motorcycle mount 44. However, as should be appreciated, the housing 24 may be configured to couple with any mount or mounting device and is not limited to coupling with the automobile mount 42 and motorcycle mount 44 discussed herein.

In various embodiments, the automobile mount 42 and/or motorcycle mount 44 may include a seat 46 operable to retain at least a portion of the device 10, a backing 48 coupled to the seat 46, and a locking device 50 coupled to the backing 48 and operable to secure the device 10. The locking device 50 may include the locking pin 40 discussed above such that functioning of the locking device 50 causes the locking pin 40 to be driven into the pin recess 38 to secure the device 10 to the automobile mount 42 or motorcycle mount 44.

Figure 6:
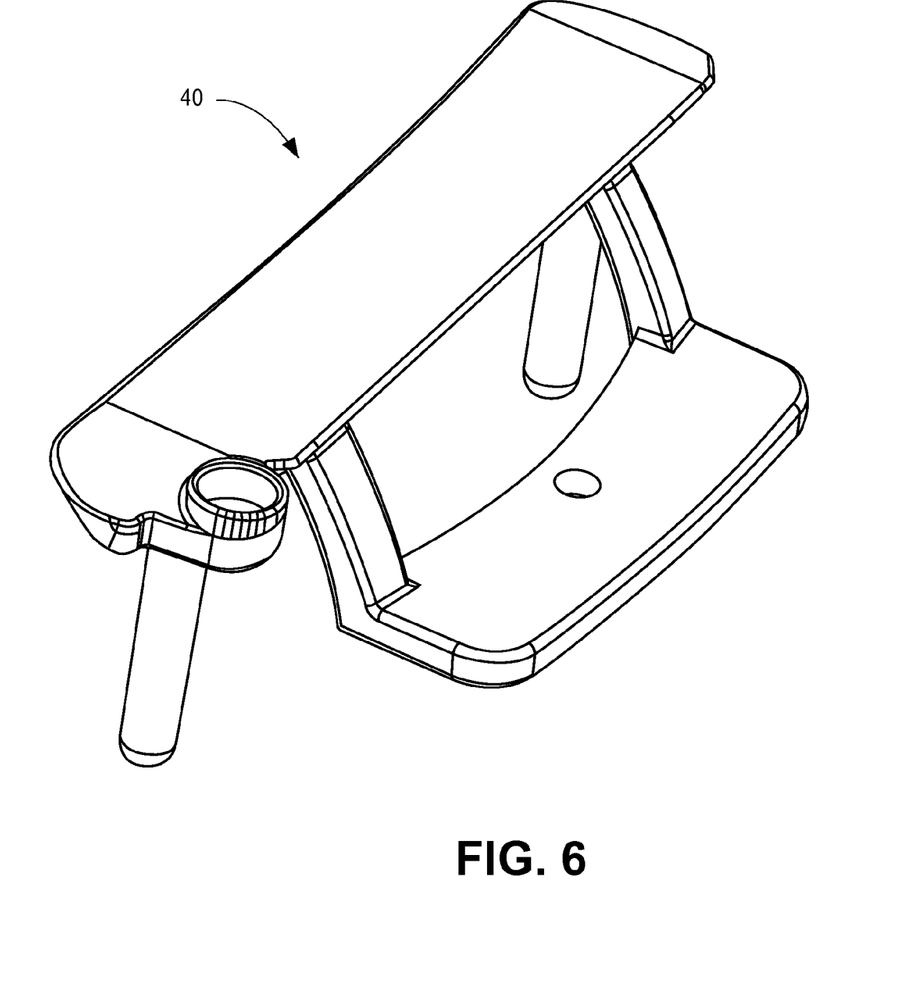
FIG. 6 is a perspective view of a locking pin operable to be utilized by the first mount.
Figure 7:
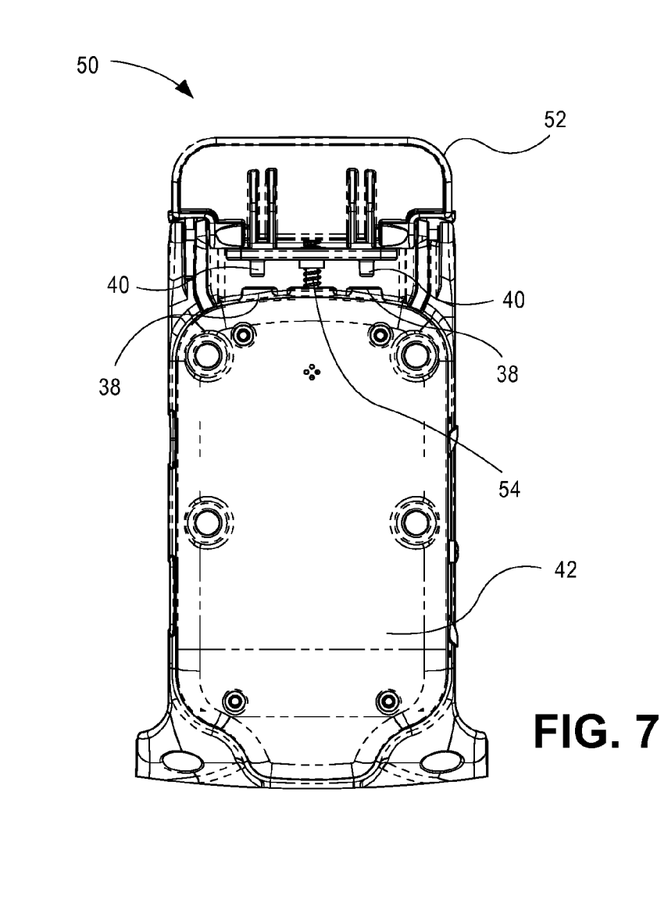
FIG. 7 is a rear view of the first mount of FIGS. 1 through 6.
Figure 8:
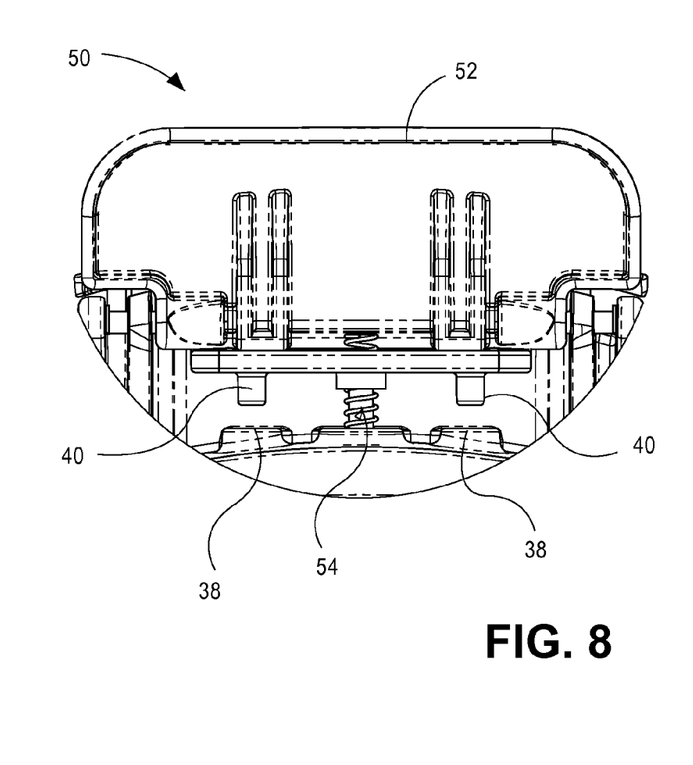
FIG. 8 is a rear view of the first mount of FIGS. 1 through 7 showing the locking device in more detail.

The locking device 50 may be coupled to the backing 48 opposite the seat 46 and include a cam 52 that is coupled with the locking pin 40. The cam 52 is operable to be rotated by a user to engage the locking pin 40 and drive the locking pin 40 into the pin recess 38 to secure the device 10. The locking device 50 may also include a biasing spring 54 to bias the locking pin 40 away from the pin recess 38. In such embodiments, the device 10 is secured by rotating the cam 52 and driving the locking pin 40 against the force provided by the biasing spring 54 and into the pin recess 38. To disengage the locking device 50, the cam 52 may again be functioned to remove the locking pin 40 from the pin recess 38. In some embodiments, as shown in FIGS. 6 through 8, the device 10 may include two pin recesses and the locking device 50 may include two joined locking pins operable to driven into the pin recesses when engaged by the cam 52.

The seat 46 is configured to allow at least a portion of the device 10 to rest upon it. For example, the device 10 may be retained by the mount 42 or 44 by sitting a portion of the housing 24 upon the seat 46 and against the backing 48, a shown in FIG. 2. Thus, in some embodiments the seat 46 may project generally perpendicularly from the longitudinal axis of the backing 48 to provide the mounts 42, 44 with generally L-shaped configurations.

The seat 46 may include a plurality of electrical interconnects 56 to electrically couple the device 10 and mount 42 or 44. The electrical interconnects 56 may be configured to provide electrical power to the device 10, to receive electrical power from the device 10, to bi-directionally communicate information and data between the device 10 and mount 42 or 44, combinations thereof, and the like.

The electrical interconnects 56 may include pins, sockets, male and female connectors, plugs, and other elements or combinations of elements operable to join and conduct electricity. In some embodiments the electrical interconnects 56 may additionally or alternatively be configured to wirelessly interconnect with the device 10, such as by using Bluetooth, WiFi, ZigBee, RFID, or other wireless protocols. The electrical interconnects 56 may also be operable to relay control signals to and from the device 10 based on the functioning of one or more mount inputs or the user interface 18.

The mounts 42, 44 may also include a speaker 58 operable to generate sound corresponding to signals received through the electrical interconnects 56. The mounts 42, 44 may also include a power supply, similar to the power source 22 discussed above, to provide electrical power to various mount elements and to the device 10 through the electrical interconnects 56. In some embodiments, the power supply may receive electrical power from the device 10 through the electrical interconnects 56 such that the mounts 42, 44 do not necessarily include an independent power source.

Figure 15:
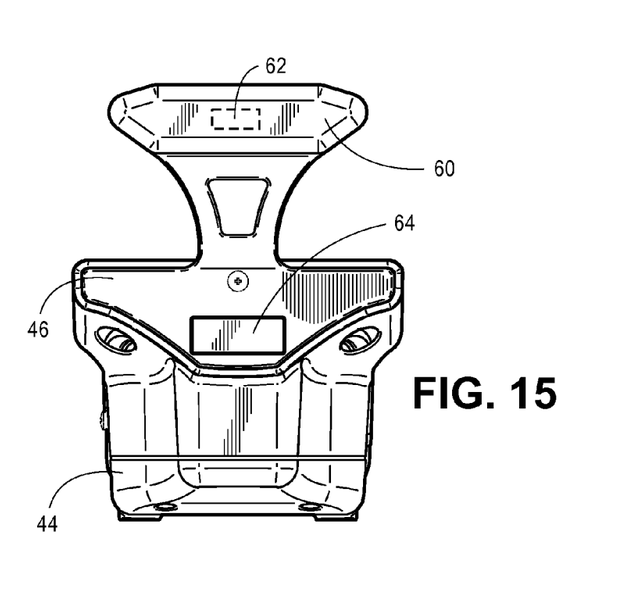
FIG. 15 is a bottom view of the second mount of FIG. 14.

In some embodiments, the mounts 42, 44 may each include a magnetic cover 60 to cover and protect the electrical interconnects 56 when the device 10 is not mounted to the mount 42 or 44. As shown in FIG. 15, the magnetic cover 60 may be flexibly coupled with the seat 46 and include a first magnetic element 62. The seat 46 may include a second magnetic element 64 such that the magnetic cover 60 may be folded under the mount 42 or 44 and joined to the bottom of the seat 46 through magnetic force. Such a configuration desirably enables the electrical interconnects 56 to be covered when the device 10 is not mounted and enables the magnetic cover 60 to be quickly and easily secured to the seat 46 when the device 10 is mounted while preventing the magnetic cover 60 from being easily lost or misplaced.

Figure 16:
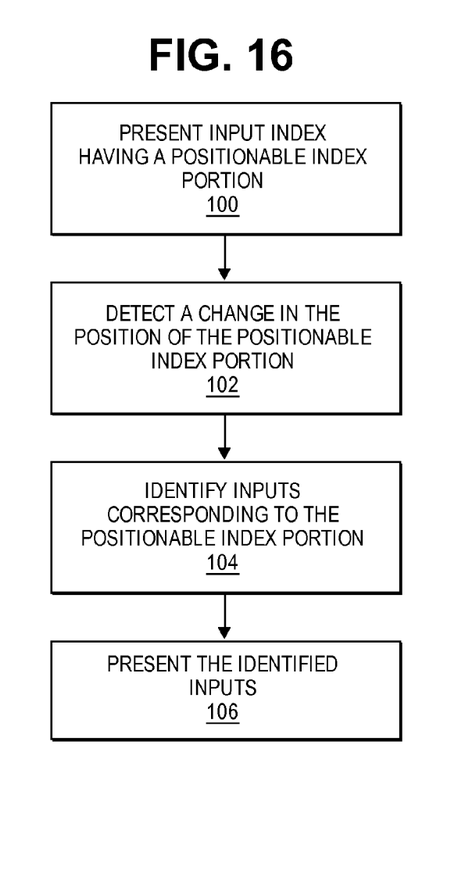
FIG. 16 is a flow chart showing some of the steps that may be performed by various embodiments of the present invention.

FIG. 16 generally illustrates various methods which may be performed by embodiments of the present invention to facilitate selection of inputs by the user. Steps 100 through 106 generally include: presenting an input index 68 having a positionable index portion 70, referenced at step 100; detecting a change in the position of the positionable index portion 70, referenced at step 102; identifying inputs corresponding to the positionable index portion 70, referenced at step 104; and presenting the identified inputs, referenced at step 106. Steps 100 through 106 may be performed in any order and need not be performed in the order illustrated. Further, one or more of steps 100 through 106 may be omitted such that embodiments of the present invention may be performed by implementing only one or more of steps 100 through 106.

In step 100, the input index 68, including the positionable index portion 70, is presented on the display 20. The input index 68 provides a listing of a plurality of inputs, such as a list of a plurality of alphanumeric characters. In some embodiments, the inputs reflected by the input index 68 correspond to letters and numbers that may be used to enter navigation information, such as location names or categories, street addresses, phone numbers, combinations thereof, and the like. However, in other embodiments the inputs reflected in the input index 68 may correspond to non-alphanumeric characters, such as graphics, pictures, videos, and photographs.

The positionable index portion 70 corresponds to only a portion of the inputs represented by the input index 68. For example, as shown in FIG. 9, the input index 68 may represent twenty-six standard English characters (A through Z) while the positionable index portion 70 represents five of the twenty-six characters (Q through U). The percentage of inputs represented by the positionable index portion 70 may be a static percentage, a user-defined value, or a dynamic value corresponding to the number of inputs represented by the input index 68. In some embodiments, the number of inputs represented by the positionable index portion 70 corresponds to the number of inputs that may be fully presented on the display 20 in step 106, as is discussed in more detail below.

The positionable index portion 70 is repositionable along the input index 70 such that the user may vary which inputs are represented by the positionable index portion 70. In embodiments where the display 20 is a touch-screen display, the user may position the positionable index portion 70 by touching the displayed positionable index portion 70 and moving the positionable index portion 70 to a new position along the input index 68. Additionally or alternatively, the user may position the positionable index portion 70 by functioning one or more of the functionable inputs 28 to cause the positionable index portion 70 to move along or on the input index 68.

In various embodiments the positionable index portion 70 is slidable along the input index 68 to enable the user to easily reposition the positionable index portion 70. However, in other embodiments the positionable index portion 70 may be repositioned utilizing non-slidable methods, such as where the positionable index portion 70 is a free-floating area that may be positioned by the user over any portion of the input index 68.

In step 102, a change in the position of the positionable index portion 70 is detected. In embodiments where the display 20 is a touch-screen display, the display 20 is operable to detect inputs by the user and the processing system 12, coupled with the display 20, is operable to determine the new position of the positionable index portion 70 based on one or more signals provided by the display 20. In embodiments where the position of the positionable index portion 70 may be changed through functioning of the functionable inputs 28, the processing system 12 is operable to receive signals from the functionable inputs 28 and detect the change in the position of the positionable index portion 70 accordingly.

In step 104, inputs corresponding to the new position of the positionable index portion 70 are identified. In particular, the processing system 12 is operable to identify the inputs corresponding to the position of the positionable index portion 70 detected in step 102. For instance, in the example of FIG. 9, the processing system 12 may identify that inputs Q through U correspond to the position of the positionable index portion 70. In some embodiments, the processing system 12 may identify the appropriate inputs by comparing the position of the positionable index portion 70 identified in step 102 to information stored within the memory 16, such as a database or listing of each input represented by the input index 68 and its associated position on the input index 68.

In step 106, the inputs identified in step 104 are presented on the display 20. In various embodiments, the input index 68 provides a representation of each of the inputs at a first size and the inputs identified in step 104 are presented at a second size greater than the first size. For instance, as shown in the example of FIG. 9, each input corresponding to the positionable index portion 70, Q through U, is presented at the second size while each input comprising the input index 68, A through Z, is presented at the first size.

Such a configuration desirably increases the size of the identified inputs to facilitate their selection by the user. For example, using his or her finger, the user may easily position the positionable index portion 70 until the desired input is represented, and then select the representation of the desired input displayed at the increased second size. Thus, the user is not required to tediously select an input presented at the first size.

The second size may be any size greater than the first size. The second size may be at least three times the size of the first size. In some embodiments, the second size may be greater in area than the tip of an average human finger to enable the user to easily select inputs presented at the second size on the touch-screen display 20. However, as should be appreciated, the second size may be only slightly larger than the first size or substantially greater than the first size, such as five or ten times the size of the first size.

The first and second size may be static or predefined values, be selectable by the user through the user interface 18, and/or be dynamically determined by the processing system 12 based on the number of inputs represented by the input index 68 and positionable index portion 70.

The input index 68, positionable index portion 70, and identified inputs presented at the second size may be independently presented by the device 10, such as by positioning the input index 68 and positionable index portion 70 on different screens. However, as shown in FIG. 9, the input index 68, positionable index portion 70, and identified inputs may be presented concurrently such that the user may rapidly move the positionable index portion 70, view the identified inputs at the second size, and select one of the identified inputs. In embodiments where the display 20 is a touch-screen display, the identified input or inputs may be selected by functioning the display 20. Additionally or alternatively, the identified input or inputs may be selected by functioning one or more of the functionable inputs 28. Steps 100 through 106 may be repeated and performed generally simultaneously such that the user may reposition the positionable index portion 70 to view and select new inputs at any time.

Figure 17:
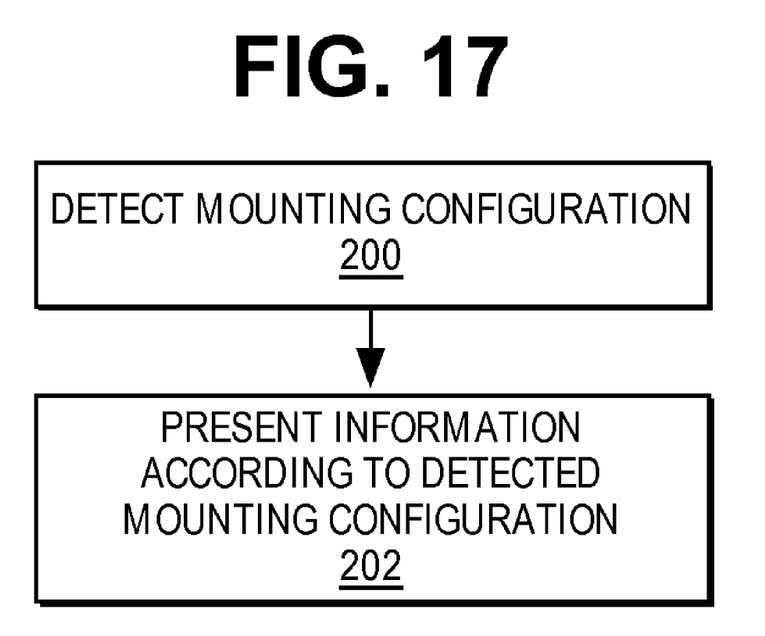
FIG. 17 is a flow chart showing some other steps that may be performed by various embodiments of the present invention.

FIG. 17 generally illustrates various methods which may be performed by embodiments of the present invention to present information according to the mounting configuration of the device 10. Steps 200 through 202 generally include: detecting the mounting configuration of the device 10, referenced at step 200; and presenting information according to the detected orientation, referenced at step 202. Steps 200 through 202 may be performed in any order and need not be performed in the order illustrated. Further, one or more of steps 200 through 202 may be omitted such that embodiments of the present invention may be performed by implementing only one or more of steps 200 through 202.

In step 200, the mounting configuration of the device 10 is detected. In some embodiments, the sensor 36 is utilized to detect the mounting configuration of the device 10. For example, as discussed above, the sensor 36 may include gyroscopes, accelerometers, compasses, inclinometers, combinations thereof, and/or other position and orientation detecting elements, to detect the orientation and/or mounting configuration of the device 10.

The sensor 36 may detect a three-axis orientation of the device 10, such as the pitch, roll, and yaw of the device 10 along a fixed three-dimensional axis. The sensor 36 may additionally or alternatively detect one-axis and/or two-axis orientations of the device 10 and need not detect three-axis orientations in all embodiments.

Figure 12:
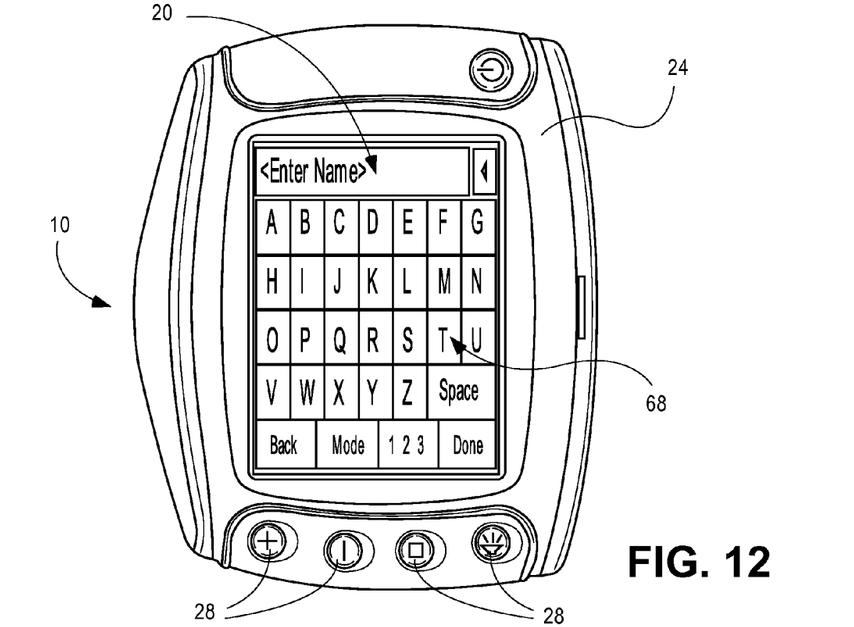
FIG. 12 is a perspective view of the electronic device of FIG. 1 presenting information on the display in a portrait orientation.

The orientation detected by the sensor 36 may indicate if the device 10 is in a first orientation, such as when the device 10 is vertically oriented, and when the device is in a second orientation, such as when the device 10 is horizontally oriented. Vertical orientations of the device 10 generally correspond to the situation where the longitudinal axis of the display 20 is perpendicular to a fixed horizon, as shown in FIG. 12. Horizontal orientations of the device 10 generally correspond to the situation where the longitudinal axis of the display 20 is parallel to the fixed horizon, as shown in FIG. 9. The sensor 36 may additionally detect other orientations of the device 10, such as by determining which end of the device 10 is positioned above or below the display 20 relative to the user.

To detect the mounting configuration of the device 10, the sensor 36 may detect if the device 10 is mounted to the automobile mount 42 or the motorcycle mount 44 and also if the device 10 is not mounted at all. In some embodiments, the sensor 36 may determine the mounting configuration of the device 10 by detecting the presence and/or configuration of the locking pin 40 and/or electrical interconnects 56. The sensor 36 may detect the presence of the locking pin 40 and/or the configuration of the electrical interconnects 56 even when the mounts 42, 44, the locking pin 40, and/or the electrical interconnects 56 are not electrically powered.

In various embodiments the processing system 12 may cooperate with the sensor 36 to detect the mounting configuration of the device 10. For example, the sensor 36 may provide signals corresponding to sensed positions and the processing system 12 may utilize the signals provided by the sensor 36 to ascertain the mounting configuration of the device 10. Additionally, the processing system 12 may receive configuration signals from the automobile mount 42 and motorcycle mount 44 through the electrical interconnects 56 to determine the mounting configuration of the device 10 independent of the sensor 36.

In step 202, information is presented on the display 20 according to the detected mounting configuration. For example, based on the mounting configuration of the device 10 detected in step 200, the processing system 12 may select the format, content, presentation, and position of the information displayed on the display 20.

The processing system 12 may select a landscape or portrait display format based on the device 10 orientation and/or mounting configuration detected in step 200. For example, when the sensor 36 detects that the device 10 is in the first orientation, corresponding to a vertical orientation, the processing system 12 and display 20 may present information in a portrait format, as shown in FIG. 12. When the sensor 36 detects that the device 10 is in the second orientation, corresponding to a horizontal orientation, the processing system 12 and display 20 may present information in a landscape format, as shown in FIG. 9.

"Portrait" format, as utilized herein, refers to the display of text and information generally perpendicular to the longitudinal axis of the display 20. "Landscape" format, as utilized herein, refers to the display of text and information generally parallel to the longitudinal axis of the display 20. In embodiments where the display 20 is a square, portrait format refers to the display of text and information perpendicular to a first axis of the display 20 and landscape format refers to the display of text generally parallel to, or along, the first axis of the display 20.

In some embodiments, the processing system 12 and display 20 are operable to present information and text on the display 20 along a plurality of display axes. For example, information may be presented in formats other then the portrait and landscape formats discussed above, such as by presenting text and information along display axes other than those parallel and perpendicular to the longitudinal axis of the display 20. Thus, as the user rotates or otherwise repositions the device 10, the processing system 12 and display 20 may dynamically refresh presented information to reflect the new orientation, thereby enabling the user to easily read the display 20 regardless of the physical orientation of the device 10.

The processing system 12 may also select an operating mode based on the orientation of the device 10 detected in step 200. Each operating mode may provide various features, functions, capabilities, and display formats. For example, the operating modes may include a pedestrian mode, an automobile mode, and a motorcycle mode. The modes may provide various features, functionality, and display formats most suitable for use by pedestrians, users within automobiles, and users sitting on motorcycles.

For example, the pedestrian mode may provide walking and exercise-related information, the automobile mode may provide travel and speed information, and the motorcycle mode may present fuel and riding information. The different modes may also present information on the display 20 in different formats, such as where information is presented on the display in portrait format when the device 10 is in the pedestrian mode and in landscape format when the device 10 is in the automobile or motorcycle modes. Each operating mode may also provide conventional navigation functionality utilizing locations determined by the location determining component 14.

The processing system 12 may select the operating mode based on the particular one, two, or three-axis orientation of the device 10 detected in step 200. In various embodiments, the processing system 12 selects the operating mode based on the mounting configuration of the device 10 detected in step 200. For example, when the sensor 36 and/or processing system 12 detects that the device 10 is mounted to the automobile mount 42, the processing system 12 may select the automobile mode; when the sensor 36 and/or processing system 12 detects that the device 10 is mounted to the motorcycle mount 44, the processing system 12 may select the motorcycle mode; and when the sensor 36 and/or processing system 12 detects that the device 10 is not mounted to a mount, the processing system 12 may select the pedestrian mode.

Thus, embodiments of the present invention enable the device 10 to present various operating modes without requiring a specific configuration input by the user as the device 10 may automatically switch from automobile mode to pedestrian mode when the user removes the device 10 from the automobile mount 42. The processing system 12 may also automatically select an appropriate operating mode based on the physical orientation of the device 10. Thus, as the user rotates or maneuvers the device 10, the processing system 12 may automatically switch between operating modes.

Steps 200 through 202 may be performed in combination with steps 100 through 106 such that the input selection features of steps 100 through 106 may be provided by one or more of the operating modes. For example, in some embodiments the motorcycle mode may enable the user to utilize the input selection features of steps 100 through 106 while the pedestrian mode may lack the input selection features. However, in some embodiments steps 200 through 202 may be performed independently of steps 100 through 106.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A device, comprising:
a housing operable to alternatively couple the device with a first mount and a second mount;
a sensor, disposed within the housing, operable for detecting a mounting configuration of the device by detecting if the housing is coupled with the first mount or the second mount;
a display, disposed within the housing, operable for displaying information; and
a processing system coupled with the sensor and the display, the processing system operable for receiving an indication of the detected mounting configuration from the sensor and presenting information on the display according to the detected mounting configuration.

2. The device as claimed in claim 1, wherein the sensor comprises an inclinometer.

3. The device as claimed in claim 1, wherein the processing system is operable to present information on the display in a first orientation when the housing is coupled with the first mount and in a second orientation with the housing is not coupled with the first mount.

4. The device as claimed in claim 1, wherein the first mount comprises an automobile mount suitable for mounting the device within an automobile and the second mount comprises a motorcycle mount suitable for mounting the device to a motorcycle.

5. The device as claimed in claim 1, wherein the processing system is operable to present information on the display in a landscape orientation when the housing is coupled with the first mount and to present information in a portrait orientation when the housing is coupled with the second mount.

6. The device as claimed in claim 1, wherein the processing system is operable to present information on the display corresponding to one of a plurality of operating modes and the processing system is operable to select one of the operating modes based on the detected mounting configuration of the device.

7. The device as claimed in claim 6, wherein the operating modes include at least an automobile mode and a motorcycle mode.

8. The device as claimed in claim 7, wherein the first mount comprises an automobile mount suitable for mounting the device within an automobile and the second mount comprises a motorcycle mount suitable for mounting the device to a motorcycle, and the processing system is operable for selecting:
the automobile mode when the sensor determines that the housing is coupled with the automobile mount, and
the motorcycle mode when the sensor determines that the housing is coupled with the motorcycle mount.

9. The device as claimed in claim 1, wherein the housing is operable to couple with interchangeable end caps.

10. The device as claimed in claim 1, wherein the sensor includes one or more electrical contacts operable to alternatively and electrically connect with the mounts to receive a signal therefrom.

11. The device as claimed in claim 10, wherein the sensor is operable to wirelessly receive the signal from the mounts.

12. The device as claimed in claim 1, wherein the sensor includes one or more of a switch, a magnetic sensor, a Hall-effect sensor, a capacitive sensor, and a wireless radio device.

13. A device, comprising:
a housing operable to alternatively couple the device with an automobile mount and a motorcycle mount;
a sensor, disposed within the housing, operable for detecting a mounting configuration of the device by detecting if the housing is coupled with the automobile mount or the motorcycle mount;
a display, disposed within the housing, operable for displaying information; and
a processing system coupled with the sensor and the display, the processing system operable for— receiving an indication of the detected mounting configuration from the sensor, presenting information on the display corresponding to one of a plurality of operating modes, the operating modes including at least an automobile mode and a motorcycle mode, selecting the automobile mode when the sensor determines that the housing is coupled with the automobile mount, and selecting the motorcycle mode when the sensor determines that the housing is coupled with the motorcycle mount.

14. The device as claimed in claim 13, wherein the processing system is further operable for selecting a pedestrian mode when the sensor determines that the device is not coupled with either the automobile mount or the motorcycle mount.

15. The device as claimed in claim 13, wherein the sensor comprises an inclinometer.

16. The device as claimed in claim 13, wherein the sensor includes one or more electrical contacts operable to alternatively and electrically connect with the mounts to receive a signal therefrom.

17. The device as claimed in claim 16, wherein the sensor is operable to wirelessly receive the signal from the mounts.

18. The device as claimed in claim 13, wherein the sensor includes one or more of a switch, a magnetic sensor, a Hall-effect sensor, a capacitive sensor, and a wireless radio device.

* * * * *